United States Patent
Srivastava et al.

(10) Patent No.: US 12,524,424 B2
(45) Date of Patent: Jan. 13, 2026

(54) SYSTEM AND METHOD OF DATA INGESTION AND PROCESSING FRAMEWORK

(71) Applicant: JIO PLATFORMS LIMITED, Ahmedabad (IN)

(72) Inventors: Shikhar Srivastava, Bangalore (IN); Shivam Runthala, Navi Mumbai (IN); Raghuram Velega, Mumbai (IN); Prem Kumar, Bangalore (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/028,547

(22) PCT Filed: Mar. 29, 2022

(86) PCT No.: PCT/IB2022/052876
§ 371 (c)(1),
(2) Date: Mar. 26, 2023

(87) PCT Pub. No.: WO2022/208338
PCT Pub. Date: Oct. 6, 2022

(65) Prior Publication Data
US 2023/0367783 A1   Nov. 16, 2023

(30) Foreign Application Priority Data
Mar. 30, 2021 (IN) .............................. 202121014163

(51) Int. Cl.
*G06F 17/00* (2019.01)
*G06F 16/25* (2019.01)

(52) U.S. Cl.
CPC .................................. *G06F 16/254* (2019.01)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS 10,360,193 B2    7/2019  Sarkar et al.
10,860,618 B2*  12/2020  Cruise ..................... G06F 11/30
(Continued)

OTHER PUBLICATIONS

International Search Report, PCT/IB2022/052876, mailed Jul. 20, 2022, Total pp. 03.

*Primary Examiner* — Hung D Le
(74) *Attorney, Agent, or Firm* — Raj S. Dave; Dave Law Group LLC

(57) ABSTRACT

The present disclosure provides for a system (100) and method (250) that facilitates a robust and effective solution to an entity or an organization by enabling ingestion and processing of a set of data packets corresponding to large streaming and batched data in a big data eco-system that may be fast and may provide optimal throughput, rate control, throttle and embedded fault tolerance. The system (100) is equipped with a data ingestion module (110) to receive the set of data packets and extract a set of attributes pertaining to the nature of data from the set of data packets received and then poll a plurality of second computing devices (104) based on the set of attributes extracted; and, upon establishing polling, store the set of data packets in the plurality of second computing devices (104).

15 Claims, 8 Drawing Sheets

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | | |
|---|---|---|---|---|
| 10,936,585 | B1* | 3/2021 | Echeverria | G06N 5/00 |
| 11,003,714 | B1* | 5/2021 | Batsakis | G06F 16/901 |
| 11,294,941 | B1* | 4/2022 | Sammer | G06F 9/542 |
| 11,321,340 | B1* | 5/2022 | Brown | G06F 16/254 |
| 11,330,002 | B2* | 5/2022 | Freedman | G06F 16/24565 |
| 11,366,842 | B1* | 6/2022 | Swaminathan | G06F 16/2477 |
| 11,500,879 | B2* | 11/2022 | Su | G06F 16/2255 |
| 11,522,812 | B1* | 12/2022 | Thoppai | G06F 16/901 |
| 11,550,847 | B1* | 1/2023 | Batsakis | G06F 16/90335 |
| 11,567,993 | B1* | 1/2023 | Batsakis | G06F 16/90335 |
| 11,599,549 | B2* | 3/2023 | Sriharsha | G06F 16/23 |
| 11,615,082 | B1* | 3/2023 | Shrigondekar | G06F 16/245 707/769 |
| 11,615,087 | B2* | 3/2023 | Pal | G06F 9/4881 707/713 |
| 11,663,176 | B2* | 5/2023 | Sriharsha | G06F 16/258 707/804 |
| 11,704,313 | B1* | 7/2023 | Andrade | G06F 16/24535 707/714 |
| 11,922,222 | B1* | 3/2024 | Chawla | G06F 9/45558 |
| 12,423,578 | B1* | 9/2025 | Zheng | G06N 3/063 |
| 2013/0110872 | A1* | 5/2013 | Barga | G06F 16/242 707/E17.073 |
| 2014/0046977 | A1* | 2/2014 | Gopalakrishnan | G06F 16/2465 707/776 |
| 2014/0337301 | A1* | 11/2014 | Jang | G06F 16/2255 707/698 |
| 2015/0193243 | A1* | 7/2015 | Varkhedi | G06F 16/254 718/1 |
| 2016/0050261 | A1* | 2/2016 | Mcdaid | H04L 45/302 709/204 |
| 2016/0306859 | A1* | 10/2016 | Musuvathi | G06F 16/1873 |
| 2016/0335311 | A1* | 11/2016 | Frank | G06F 16/24565 |
| 2017/0004128 | A1* | 1/2017 | Yoon | G06F 40/295 |
| 2017/0039227 | A1* | 2/2017 | Herbst | G06F 16/219 |
| 2017/0046434 | A1* | 2/2017 | Liu | G06F 16/221 |
| 2017/0076105 | A1* | 3/2017 | Paulovicks | G06F 16/10 |
| 2017/0102984 | A1* | 4/2017 | Jiang | H04L 41/142 |
| 2017/0103267 | A1* | 4/2017 | Mishra | G06F 18/41 |
| 2017/0139929 | A1* | 5/2017 | Aggarwal | G06F 16/2471 |
| 2017/0139974 | A1* | 5/2017 | Javed | G06F 16/2393 |
| 2017/0169078 | A1* | 6/2017 | Fradkin | G06F 16/2471 |
| 2017/0200153 | A1* | 7/2017 | Hewitt | H04L 63/0428 |
| 2017/0228439 | A1* | 8/2017 | Chen | G06F 40/211 |
| 2017/0374561 | A1* | 12/2017 | Zhang | H04W 24/08 |
| 2018/0053110 | A1* | 2/2018 | Kang | G06N 7/01 |
| 2018/0069925 | A1* | 3/2018 | Lavasani | G06F 16/28 |
| 2018/0075357 | A1* | 3/2018 | Subramanian | G06N 20/00 |
| 2018/0121519 | A1* | 5/2018 | Cook | G06F 16/2457 |
| 2018/0165309 | A1* | 6/2018 | Tajuddin | G06F 16/258 |
| 2018/0173812 | A1* | 6/2018 | Agarwal | G06F 16/254 |
| 2018/0203744 | A1 | 7/2018 | Wiesmaier et al. |
| 2018/0204111 | A1* | 7/2018 | Zadeh | G06V 10/764 |
| 2018/0268026 | A1* | 9/2018 | Ratcliff | G06F 16/1844 |
| 2018/0300806 | A1* | 10/2018 | Wittkotter | G06F 16/2282 |
| 2019/0163842 | A1* | 5/2019 | Pal | G06F 16/90335 |
| 2019/0180325 | A1* | 6/2019 | Carrasco | G06F 16/9535 |
| 2019/0197074 | A1* | 6/2019 | Feham | G06F 16/9536 |
| 2019/0229992 | A1* | 7/2019 | Margoor | G06F 16/217 |
| 2019/0317945 | A1* | 10/2019 | Ezick | G06F 16/254 |
| 2020/0007499 | A1* | 1/2020 | Huang | H04L 67/62 |
| 2020/0117757 | A1 | 4/2020 | Yanamandra et al. |
| 2020/0125618 | A1* | 4/2020 | Yang | G06Q 10/0637 |
| 2020/0242164 | A1* | 7/2020 | Gowda | G06F 16/954 |
| 2020/0320088 | A1* | 10/2020 | Hill | G06F 16/254 |
| 2020/0335225 | A1* | 10/2020 | Quintero Padron | G16H 50/20 |
| 2021/0019637 | A1* | 1/2021 | Peter | G06N 5/025 |
| 2021/0064662 | A1* | 3/2021 | Chen | G06F 16/9035 |
| 2021/0109904 | A1* | 4/2021 | Kasi | G06F 16/24522 |
| 2021/0117416 | A1* | 4/2021 | Sriharsha | G06N 20/00 |
| 2021/0117425 | A1* | 4/2021 | Rao | H04L 9/0866 |
| 2021/0158074 | A1* | 5/2021 | Wray | G06Q 10/1053 |
| 2021/0225510 | A1* | 7/2021 | Yang | G16H 50/30 |
| 2021/0234884 | A1* | 7/2021 | Brown | H04L 63/1433 |
| 2021/0326336 | A1* | 10/2021 | Garapati | G06F 16/2393 |
| 2021/0391056 | A1* | 12/2021 | Yu | G16H 50/20 |
| 2022/0083566 | A1* | 3/2022 | Ben Ze'Ev | G06F 16/2282 |
| 2022/0084396 | A1* | 3/2022 | Gao | G08G 1/0125 |
| 2022/0200959 | A1* | 6/2022 | Chen | H04L 63/0254 |

* cited by examiner

SYSTEM AND METHOD OF DATA INGESTION AND PROCESSING FRAMEWORK

CROSS-REFERENCE TO RELATED APPLICATION(S)

This application is a National Stage of International Application No. PCT/IB2022/052876, filed on Mar. 29, 2022, which claims priority to Indian Patent Application No. 202121014163, filed Mar. 30, 2021, the disclosures of which are hereby incorporated by reference in their entirety.

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to system and methods that facilitate ingestion of data. More particularly, the present disclosure relates to a system and method for facilitating ingestion and analytical processing for big data processing and insights.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

As the costs of data storage have declined over the years, and as the ability to interconnect various elements of the computing infrastructure has improved, more and more data pertaining to a wide variety of applications can potentially be collected and analyzed. For example, mobile phones can generate data indicating their locations, the applications being used by the phone users, and so on, at least some of which can be collected and analyzed in order to present customized coupons, advertisements and the like to the users. The analysis of data collected by surveillance cameras may be useful in preventing and/or solving crimes, and data collected from sensors embedded at various location within airplane engines, automobiles or complex machinery may be used for various purposes such as preventive maintenance, improving efficiency and lowering costs. The increase in volumes of streaming data has been accompanied by (and in some cases made possible by) the increasing use of commodity hardware. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Hence the rapid growth of software industry and increase in substantial user base because of easier access to technology, have triggered the rise in digital footprint, system logs and information sets about customers and devices, thereby exponentially increasing the amount of produced data. These big datasets can be divided into multiple types based on their various characteristics such as Queryable and Non-Queryable data sources. The Queryable Data Sources may include data sources like RDBMS where analysis or query may be performed directly. The Non-Queryable Data Sources may include data sources such Files and Message streams which cannot be queried directly. The Source System Datasets can be further divided into File-based Datasets, Streaming Datasets, RDBMS Datasets and the like. File-based Datasets may include system generated log files, application data, data which is periodically being exported and dumped frequently from external systems, enterprise buses, and the like. The files can be stored over SFTP, Shared Network Storage, Amazon S3, and the like. The Streaming Datasets can be event driven data generated by devices/systems being sent to Messaging/Data bus queue systems like Kafka, HiveMQ or Solace. The RDBMS may be hosted in RDBMS systems like Oracle, MySQL, MSSQL, and the like.

Despite the availability of virtualized computing and/or storage resources at relatively low cost from various providers, however, the management and orchestration of the collection, storage and processing of large dynamically fluctuating streams of data remains a challenging proposition for a variety of reasons. As more resources are added to a system set up for handling large streams of data, for example, imbalances in workload between different parts of the system may arise. If left unaddressed, such imbalances may lead to severe performance problems at some resources, in addition to underutilization (and hence wastage) of other resources. For example, File-based Datasets, Streaming Datasets, RDBMS Datasets and the like have the potential to provide enormous context for making truly Data-Driven decisions such as diagnosis, prediction of failure and the like. But such sources of big data have never been fully investigated and there is no available technology that can integrate storing, processing and analysing the large volume of data. To move RDBMS Datasets into Big Data Analytics System, available solutions such as Sqoop or Propriety solutions like Oracle's Golden Gate and the like may exist. But for File-based and Streaming Datasets there is no Tool/Framework available which allows ingestion of the datasets into Big Data Systems and process them in Streaming or Batched fashion with customized throughput, explicit schema registry, rate control, throttle and embedded fault tolerance and pluggable business processing logic. Clients may also be concerned regarding the security of their streaming data, or the results of analyzing streaming data, if such data or results are stored at facilities that the clients do not control. The failures that naturally tend to occur with increasing frequency as distributed systems grow in size, such as the occasional loss of connectivity and/or hardware failure, may also have to be addressed effectively to prevent costly disruptions of stream data collection, storage or analysis.

There is therefore a need in the art to provide a system and a method that can facilitate integration of storing, processing as well as analysing big data.

OBJECTS OF THE PRESENT DISCLOSURE

Some of the objects of the present disclosure, which at least one embodiment herein satisfies are as listed herein below.

An object of the present disclosure is to provide for a system and method that facilitates a framework for Big Data applications.

An object of the present disclosure is to provide for a system and method that is resilient to failure as it has the capability to resume or pause the method that fails or is newly added.

An object of the present disclosure is to provide for a system and method that facilitates parallelism and throughput to be easily configured based on the use case.

An object of the present disclosure is to provide for a system and method that facilitates ingestion and processing of data in both streaming and batch fashion.

An object of the present disclosure is to provide for a system and method that facilitates logging for source data and identification of bad input or issues with schema of the data.

An object of the present disclosure is to provide for a system and method that facilitates multiple sinks for data from same source.

An object of the present disclosure is to provide for a system and method that facilitates ability to control the number of output files being generated.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present disclosure provides a system and method for facilitating ingestion of a set of data packets of a big data eco-system by a first computing device. The system may include one or more processors coupled with a memory, wherein the memory stores instructions which when executed by the one or more processors causes the system to: receive, at a data ingestion module operatively coupled to the first computing device, the set of data packets pertaining to a plurality of big data sources, extract, by the data ingestion module, a set of attributes from the set of data packets received, the set of attributes pertaining to the nature of data received. The system may further be configured to poll, by the data ingestion module, a plurality of second computing devices based on the set of attributes extracted, and upon establishing polling, store, by the data ingestion module (110), the set of data packets in the plurality of second computing devices.

The present disclosure further provides for a method for facilitating ingestion of a set of data packets of a big data eco-system by a first computing device. The method may include the steps of receiving, at a data ingestion module operatively coupled to a second computing device, the set of data packets, wherein the set of data packets pertain to a plurality of big data sources; extracting, by the data ingestion module, a set of attributes from the set of data packets received, the set of attributes pertaining to the nature of data received; polling, by the data ingestion module, a plurality of second computing devices based on the set of attributes extracted; and, upon establishing polling, storing, by the data ingestion module, the set of data packets in the plurality of second computing devices.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present invention provides a robust and effective solution to an entity or an organization by enabling ingestion and processing of large streaming and batched data in a big data eco-system that may be fast and may provide optimal throughput, rate control, throttle and embedded fault tolerance.

Figure 1:
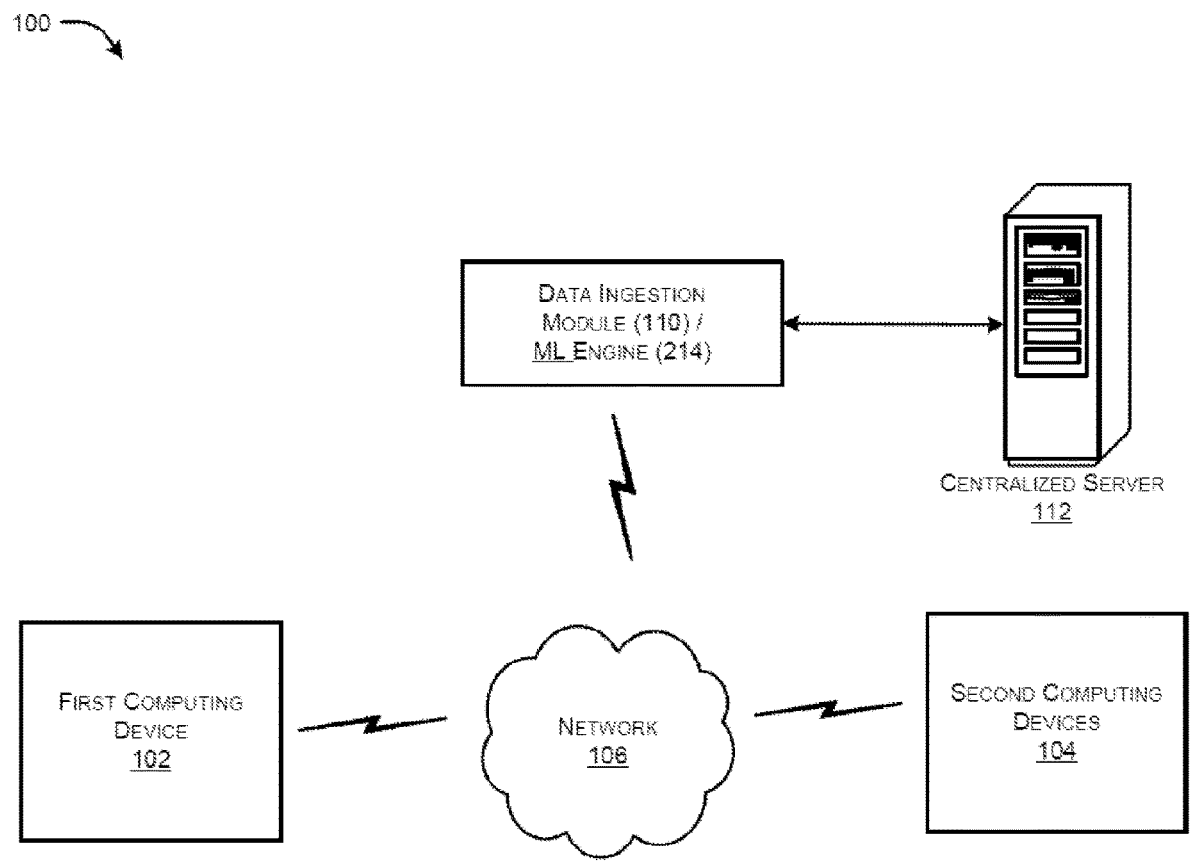
FIG. 1 that illustrates an exemplary network architecture in which or with which data ingestion module of the present disclosure can be implemented, in accordance with an embodiment of the present disclosure.

Referring to FIG. 1 that illustrates an exemplary network architecture (100) in which or with which data ingestion module (110) of the present disclosure can be implemented, in accordance with an embodiment of the present disclosure. As illustrated, the exemplary architecture (100) includes a data ingestion module (110) equipped with a machine learning engine (214) (also referred to as data ingestion module 110 or data ingestion and processing framework 110 hereinafter) for facilitating ingestion and processing of a set of data packet from one or more first computing devices (102) to be stored in one or more second computing devices (104). In an embodiment, the set of data packets may be big but not limited to it. The data ingestion module (110) may receive the set of data packets pertaining to a plurality of big data sources associated with the first computing device. For example, the big data sources can include internal documents of an entity, sensors, controllers, in house call centres, website logs, social media, official statistics, weather forecasts, publicly available data sets for data mining. The big data associated with the big data sources may include a log of records where each describes some event such as a purchase in a store, a web page view, a sensor value at a given moment, a comment on a social network, video frames and the like. The data ingestion module (110) may extract, by the data ingestion module, a set of attributes from the set of data packets received, the set of attributes pertaining to the nature of data received. The data ingestion module (110) may further be configured to poll a plurality of second computing devices based on the set of attributes extracted, and upon establishing polling, store, by the data ingestion module (110), the set of data packets in the plurality of second computing devices (104).

In an exemplary embodiment, the one or more first computing devices (102) may include a plurality of Distributed Source Systems such as Kafka, The Hadoop Distributed File System (HDFS) and the like. And the one or more second computing devices (104) may include a plurality of Distributed Storage Systems such as Elasticsearch, Hive, HDFS but not limited to the like with pluggable transformation and customized throughput, rate control, throttle and embedded Fault Tolerance.

In an embodiment, the set of data packets may be ingested by the first computing device (102) in any format.

The data ingestion module (110) may be coupled to a centralized server (112) (also referred to as the server 112). The data ingestion module (110) may also be operatively coupled to one or more first computing devices (102) and one or more second computing devices (104) through a network (106). The data ingestion module (110) may be further configured to process the set of data packets based received based on a set of predefined configuration parameters. In an exemplary embodiment, the data ingestion module (110) upon execution of a set of instructions enable a plurality of users to customize the functionality of the data ingestion module. Further, upon execution of the set of instructions, the data ingestion module may be resumed or paused whenever the first set of instructions fail to execute, or a new patch is being applied to the data ingestion module.

The data ingestion module (110) may be configured to provide scaling, parallelism and throughput to provide data-driven insights based on the predefined configuration parameters. The data ingestion module (110) may ingest and process streaming and batch data packets and a combination thereof by a plurality of processing logic modules associated with the data ingestion module (110), and wherein the ingested data may be passed through a plurality of micro batches, each micro-batch corresponding to a specific thread. In an embodiment, the processing logic modules may be pluggable and user defined.

In an exemplary embodiment, the data ingestion module (110) may identify bad input or issues with schema of the stored data in real time or at any given time in an embodiment, the data ingestion module (110) may further log bad input or corrupt data present in the set of data packets received into a first queue. The set of data packets after being analysed and processed may be written into one or more second computing devices (104) (also referred to as sinks (104)).

In an exemplary embodiment, the plurality of second computing devices (104) may act as sink for a set of data packets from the same first computing device (102). The data ingestion module (110) may be further configured to control a plurality of output files generated from the set of data packets received as inputs. The data ingestion module (110) may be configured to ingest the set of data packets in real time or during a pre-determined time and the set of data packets may be compressed and arranged in a predefined format in real time to be stored in a configurable storage associated with the second computing device (104) or hosted in any given time without disrupting any flow of data.

In an embodiment, the data ingestion module (110) may be configured to update the database every time the data ingestion module (110) may send the processed set of data packets to the second computing device (104).

In an embodiment, the one or more first computing devices (102), the one or more second computing devices (104) may communicate with the data ingestion module (110) via set of executable instructions residing on any operating system, including but not limited to, Android™, iOS™, Kai OS™ and the like. In an embodiment, to one or more first computing devices (102), and the one or more second computing devices (104) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (102), and the one or more second computing devices (104) may not be restricted to the mentioned devices and various other devices may be used. A smart computing device may be one of the appropriate systems for storing data and other private/sensitive information.

In an embodiment, the data ingestion module (110) or the centralized server (112) may include one or more processors coupled with a memory, wherein the memory may store instructions which when executed by the one or more processors may cause the system to access content stored in a network.

Figure 2A:
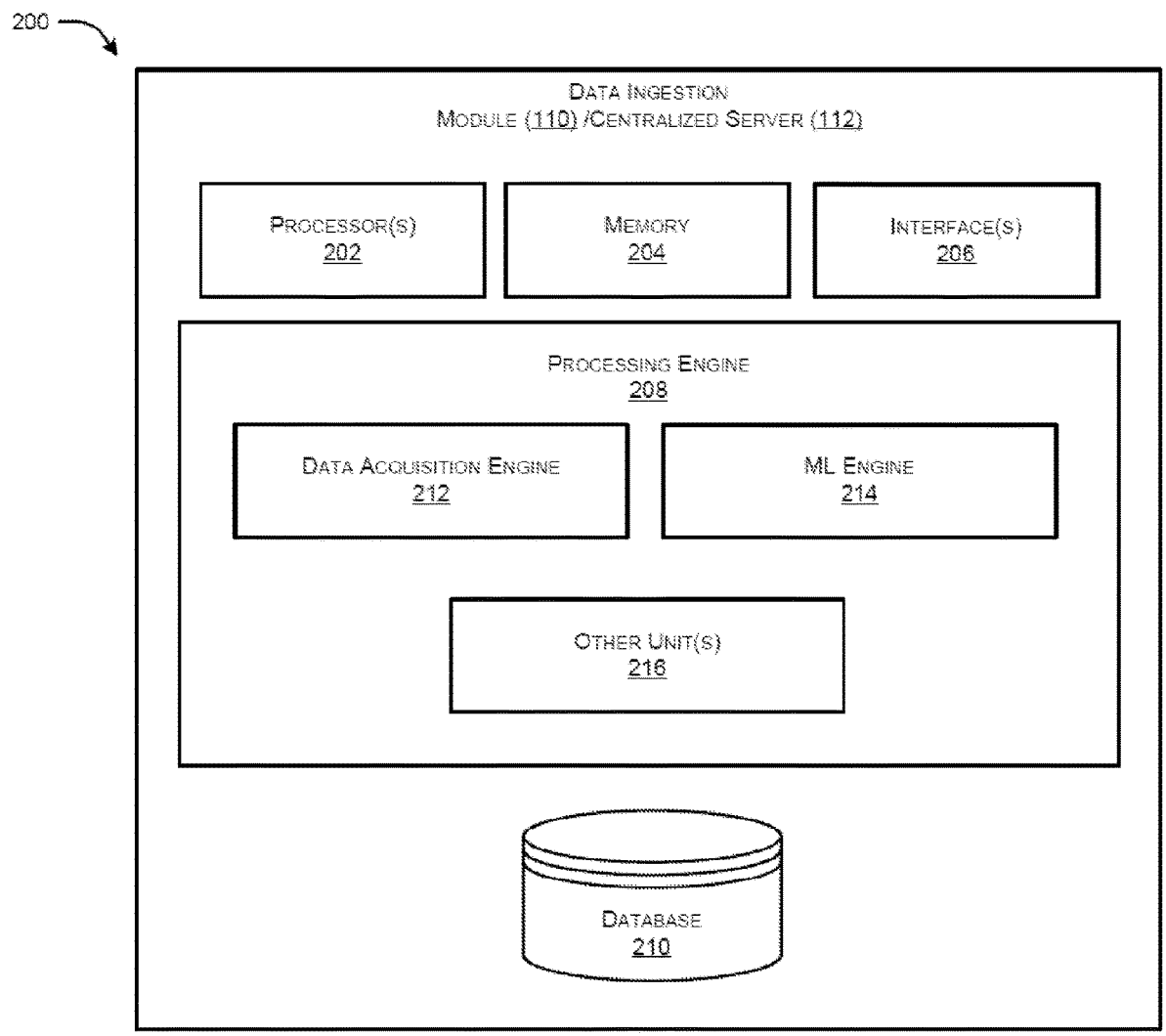
FIG. 2A illustrates an exemplary representation of data ingestion module/centralized server, in accordance with an embodiment of the present disclosure.

FIG. 2A with reference to FIG. 1, illustrates an exemplary representation of data ingestion module (110)/centralized server (112) for ingesting and processing big datasets, in accordance with an embodiment of the present disclosure. In an aspect, the data ingestion module (110)/centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the data ingestion module (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the data ingestion module (110)/centralized server (112) may include an interface(s) (206). The interface(s) (206) may comprise a variety of interfaces, for example, interfaces for data input and output devices, referred to as I/O devices, storage devices, and the like. The interface(s) (206) may facilitate communication of the data ingestion module (110). The interface(s) (206) may also provide a communication pathway for one or more components of the data ingestion module (110) or the centralized server (112). Examples of such components include, but are not limited to, processing engine(s) (208) and a database (210).

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the data ingestion module (110)/centralized server (112) may comprise the machine-readable storage medium storing the instructions and the processing resource to execute the instructions, or the machine-readable storage medium may be separate but accessible to the data ingestion module (110)/centralized server (112) and the processing resource. In other examples, the processing engine(s) (208) may be implemented by electronic circuitry.

The processing engine (208) may include one or more engines selected from any of a data acquisition engine (212), a machine learning (ML) engine (214), and other engines (216).

The data acquisition engine (212) may receive the set of data packets pertaining to a plurality of big data sources and extract a set of attributes from the set of data packets received, the set of attributes pertaining to the nature of data received.

The ML engine (214) may poll a plurality of second computing devices based on the set of attributes extracted; and, upon establishing polling, store the set of data packets in the plurality of second computing devices. The ML engine (214) may be further configured to compress and arrange the set of data packets received in a predefined format in real time to be stored in a configurable storage associated with the second computing device or hosted in any given time without disrupting any flow of data.

Figure 2B:
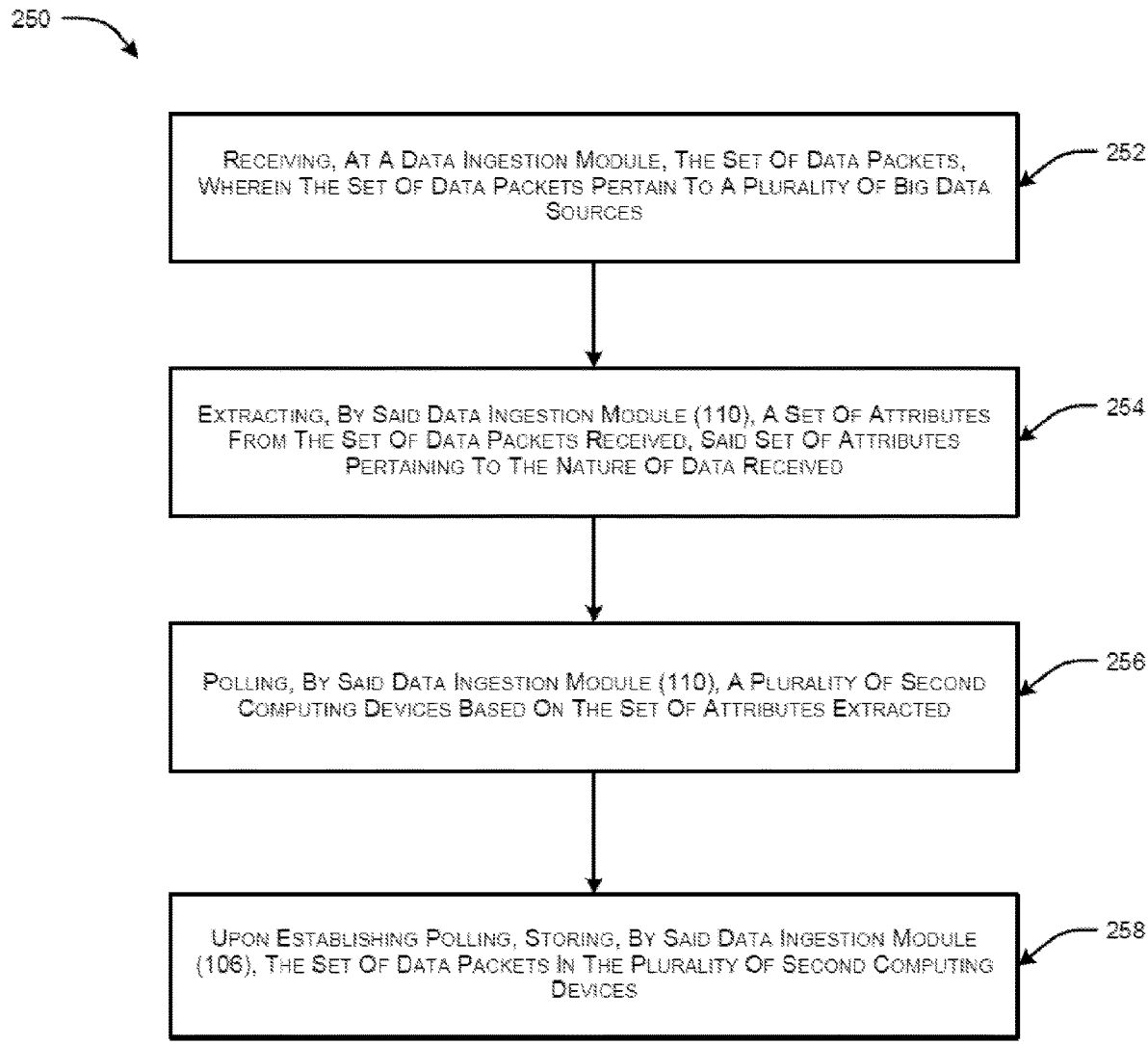
FIG. 2B illustrates an exemplary representation of a proposed method, in accordance with an embodiment of the present disclosure.

FIG. 2B illustrates an exemplary representation of a proposed method, in accordance with an embodiment of the present disclosure. The present disclosure further provides for the method (250) for facilitating ingestion of a set of data packets of a big data eco-system by a first computing device. The method (250) may include at 252 the step of receiving, the set of data packets pertaining to a plurality of big data sources; and at 304, the step of extracting a set of attributes from the set of data packets received, the set of attributes pertaining to the nature of data received.

The method (250) may further include at 254 the step of polling a plurality of second computing devices based on the set of attributes extracted; and upon establishing polling, at 256, storing the set of data packets in the plurality of second computing devices, and wherein the stored data is retrieved in micro batches.

Figure 3:
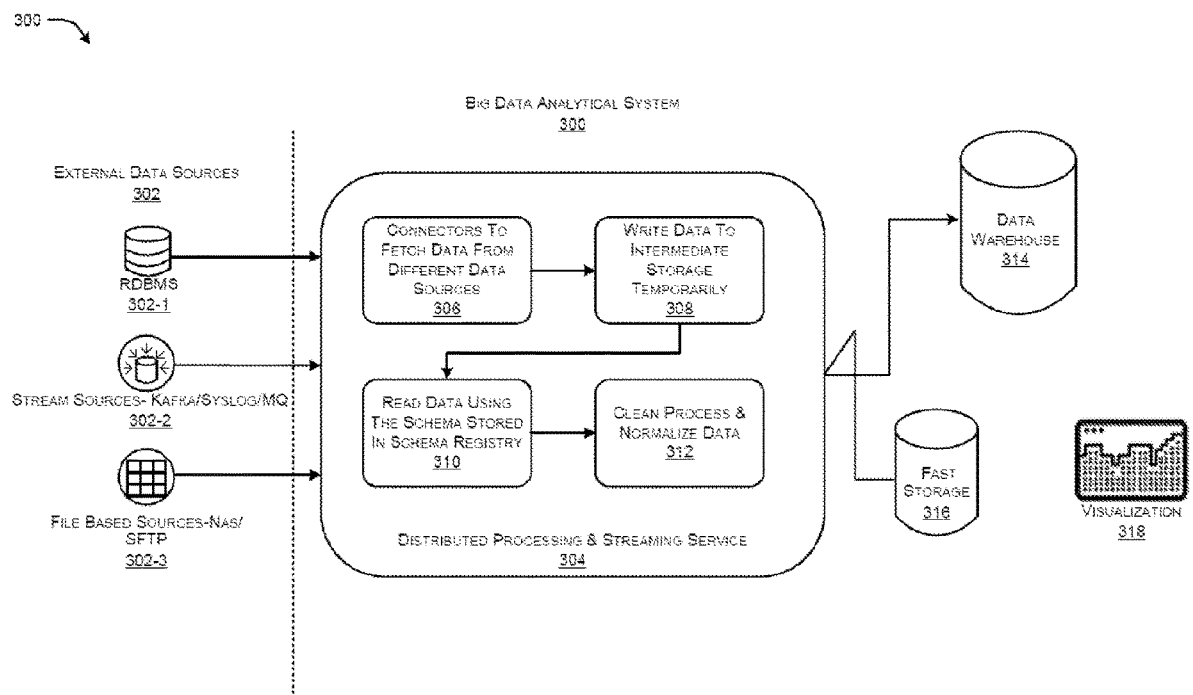
FIG. 3 illustrates an exemplary representation of a big data system architecture for ingesting and processing big data, in accordance with an embodiment of the present disclosure.

FIG. 3 illustrates an exemplary representation of a big data system architecture for ingesting and processing big data, in accordance with an embodiment of the present disclosure. As illustrated, in an aspect, the big data system architecture (300) may include external data sources (302) that may include RDBMS sources (302-1), streaming sources (302-2) such as Kafka, syslog, MQ and the like and File-based sources (302-3) such as NAS, SFTP and the like. The big data from the external data sources (302) may be ingested by a distributed processing and streaming module (304) through connectors to fetch data from the external data sources (306). The data fetched by the connectors may be then temporarily written to intermediate storage (308). The data may be then read using a predefined schema that may pertain to a predefined organization of the data as a blueprint of how the database or a schema registry may be constructed (310). The data read may be then sent for cleaning and normalization of the data (312). In an exemplary embodiment, the distributed processing and streaming module (304) may include APACHE SPARK, STORM, HIVE, KAFKA. FLINK, NIFI and the like. The data from the distributed processing and streaming module (304) may be then sent to any or a combination of a fast storage (316) or a data ware house (314). In a way of example and not as a limitation, the fast storage (316) may include REDIS, ELASTICSEARCH, SOLR and the like while the data warehouse (314) may include HIVE, DRUID, CASSANDRA, HBASE, KUDU and the like. The data may be analysed and displayed in the visualization module (318).

Figure 4:
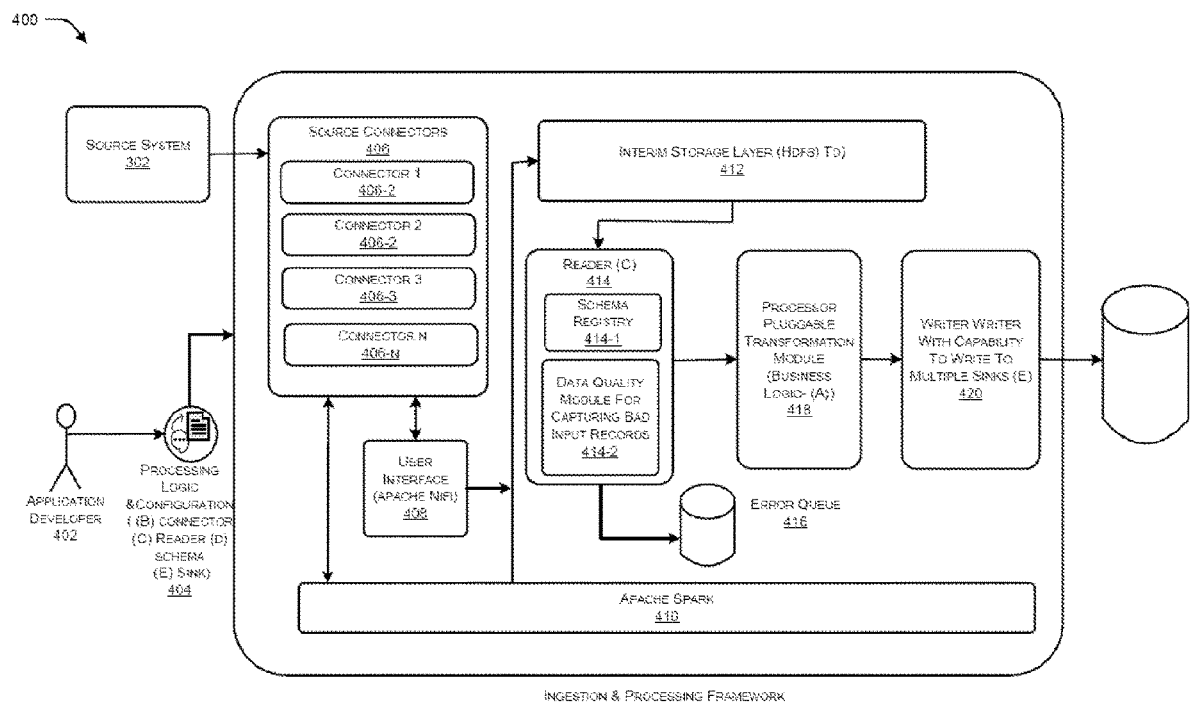
FIG. 4 illustrates an exemplary representation of the proposed system architecture for big data ingestion and processing, in accordance with an embodiment of the present disclosure.

FIG. 4 illustrates an exemplary representation of the proposed system architecture for big data ingestion and processing, in accordance with an embodiment of the present disclosure.

As illustrated, in an aspect, the proposed system may include a plurality of source connectors (406-1, 406-2 ... 406-n) to connect to source data systems (302) and fetch data which may be ingested and processed. An application developer (402) may maintain a pluggable processing logic and a predefined configuration parameter. The data fetched by the source connectors may be then sent to an integrated data logistics platform such as but not limited to an Apache NIFI (408) and Apache Spark (410) and from the Apache NIFI (408) and Apache Spark (410), the data may be stored in an interim storage layer such as but not limited to Hadoop Distributed File System (HDFS) TD (412). A Configurable Reader (414), may take a schema from the Schema Registry (414-1) according to the predefined configuration parameters provided and then may read the data with the schema. A Data Quality Module (414-2) may log a plurality of bad input records from the data into a separate error queue (416). The data after removal of the plurality of bad input records by the data quality module (414-2) may be sent to a processor that may include pluggable transformation module (418). The data may be then sent to a Writer (420) which may write the data to a sink storage system (422). A plurality of sinks such as HDFS, HIVE REDIS, ELASTIC SEARCH but not limited to the like can be configured for the same application. In an exemplary embodiment, the system may use Apache Spark but not limited to it as a computation engine.

Figure 5A:
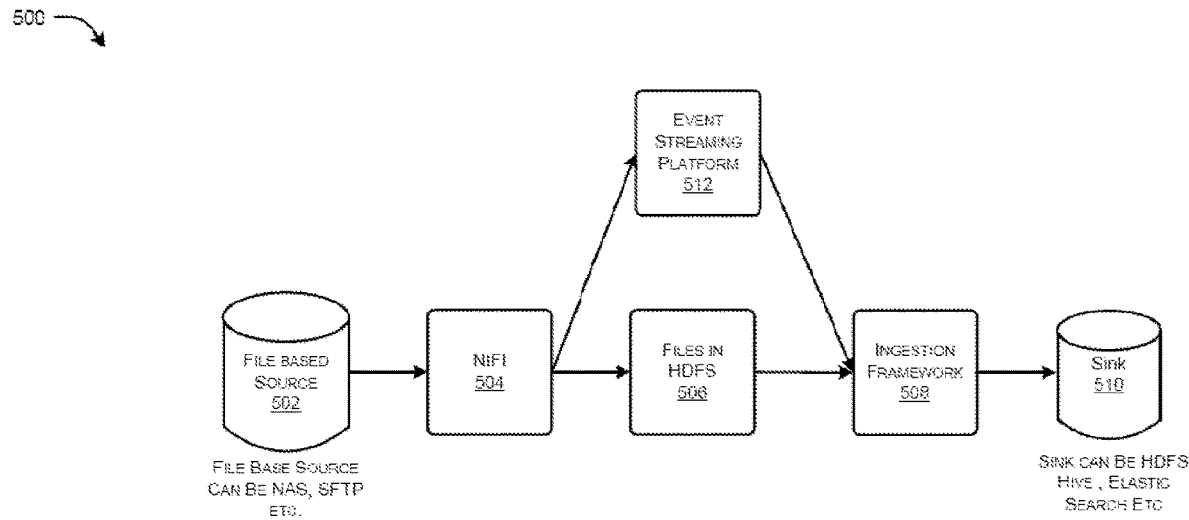
FIGS. 5A-5D illustrate exemplary representations of a flow diagram of a data ingestion and processing framework method, in accordance with an embodiment of the present disclosure.

FIGS. 5A-5D illustrate exemplary representations of a flow diagram of a data ingestion and processing framework method (500), in accordance with an embodiment of the present disclosure. As illustrated in FIG. 5A, in an aspect, the data ingestion and processing framework method (500) may include at block 502 a file based source. In an exemplary embodiment, the data ingestion and processing framework method (500), can help in ingestion and processing of data in a streaming mode. In an exemplary embodiment, but not limited to it, a plurality of telecom data streams may be file-based sources and the fastest way to ingest the plurality of telecom data streams into a Hive where the plurality of telecom data streams may be read directly from the file based sources such as SFTP, NAS and the like or reading the plurality of telecom data streams from HDFS at block 506 and metadata from an event streaming platform such as but not limited to Kafka at block 512 after doing the ingestion using the integrated data logistics platform, NIFI at block 504 into the HDFS at block 506.

In an exemplary embodiment the fastest ingestion of the data may be obtained by reading the data from the HDFS at block 506 but not limited to it.

In an exemplary embodiment, the file based sources may come from SFTP, NAS and the like in a streaming way. The NiFi at block 504 may be used to read the data from the file based sources and write the data into HDFS at block 506 and metadata into a Kafka at block 512. The data written may be then read from the metadata from Kafka at block 512 and the files from HDFS at block 506 and the data may be processed in a micro-batch streaming fashion based on the predefined configuration parameters in the ingestion framework at block 508 and the output may be written in a sink at block 510 that may include a HDFS Hive, HDFS, any Hive, elastic search but not limited to the like.

Figure 5B:
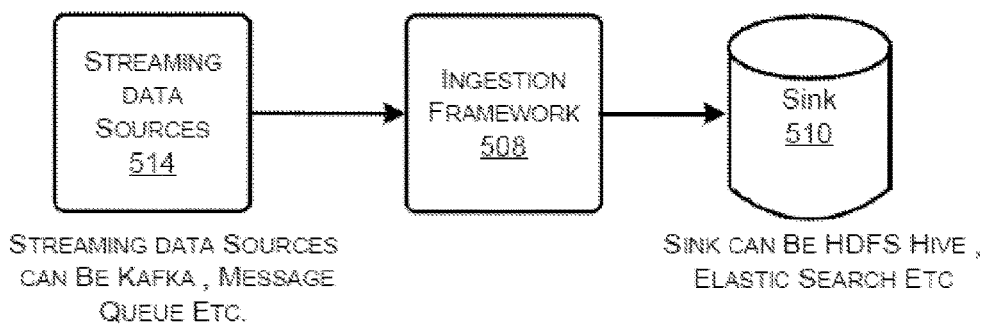

In another exemplary embodiment, as illustrated in FIG. 5B, the streaming data sources may pertain to the event streaming platform such as but not limited to MQ or Kafka based at block 514 but not limited to it. An NIFI flow to read the data from Kafka topic may be provided to merge the data into files and write the files into HDFS and metadata into Kafka topic. The data written may be then read from the metadata from Kafka at block 512 and the files from HDFS at block 506 and the data may be processed in a batch streaming fashion based on the predefined configuration parameters in the ingestion framework at block 508 and the output may be written in a sink at block 510 that may include a HDFS Hive, HDFS, any Hive, elastic search but not limited to the like.

In yet another exemplary embodiment, the ingestion framework at block 508 may directly read from the event streaming platform such as a Kafka topic using the data receiver framework (or herein as an example a Kafka receiver framework) in micro-batches, may write the batch to HDFS, may spark read the HDFS File, may process the data and write the data into the sink or the Hive.

Figure 5C:
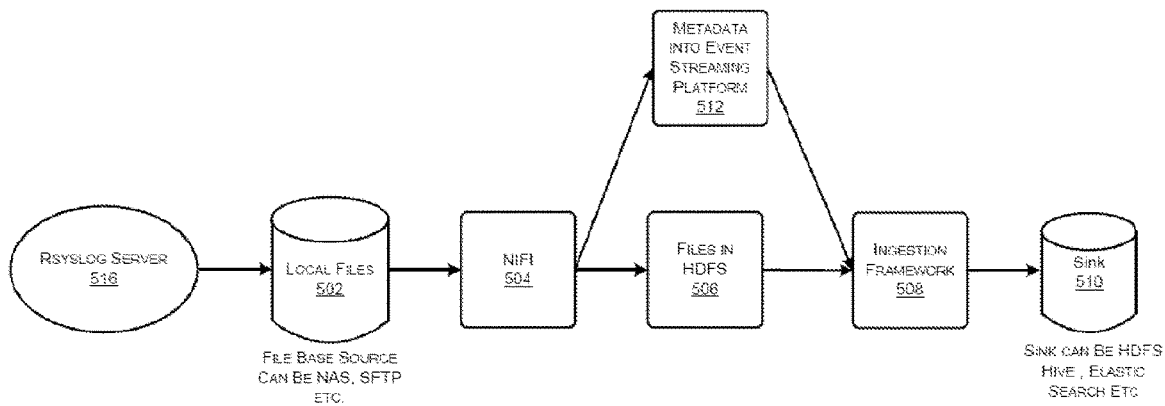

In yet another exemplary embodiment, as illustrated in FIG. 5C, the source may send the data to a server such as but not limited to a Rsyslog server at block 516 but not limited to it. The Rsyslog may write the data into a local file system. The NIFI flow to read the data from Kafka topic may be provided to merge the data into files and write the files into HDFS and metadata into Kafka topic. The data written may be then read from the metadata from the Kafka at block 512 and the files from HDFS at block 506 and the data may be processed in a batch streaming fashion based on the predefined configuration parameters in the ingestion framework at block 508 and the output may be written in a sink at block 510 that may include a HDFS Hive, HDFS, any Hive, elastic search but not limited to the like.

Figure 5D:
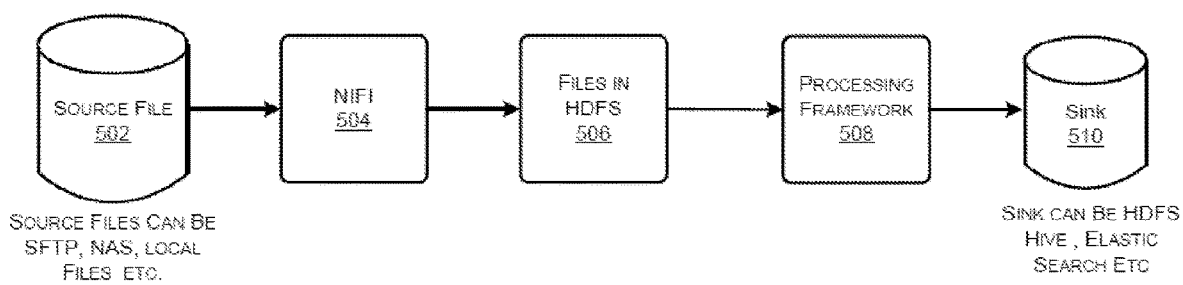

In yet another exemplary embodiment, as illustrated in FIG. 5D, an Ingestion and Processing Framework at block 508 may also support at least one-time batch processing of data specified by a location or a table that may be read from and may be defined by a processing logic. The data may be written according to the predefined configuration parameters.

In an embodiment, for triggering any pipeline, a spark submit script may be required. Based on parameters in the spark script, the predefined configuration parameters may get loaded at runtime.

In an embodiment, source data may be read based on the predefined configuration parameters such as format of the incoming data, schema file location, number of files to be processed in each batch and the like.

In an embodiment, corrupt or bad data may be identified and may get logged to a HDFS directory and non-corrupt data may be processed further.

In an embodiment, transformation may happen on an incoming data based on transformation logic available for a given source type.

In an embodiment, the processed may be written into one or more sinks such as Hive, HDFS, Elastic Search but not limited to the like.

In an embodiment, the same cycle may continue for a streaming ingestion.

In an embodiment, the data may be stored in compressed and optimized formats such as ORC but not limited to it. The storage requirements may reduce drastically for heavy raw data streams and also may help in querying the data more efficiently.

In an exemplary embodiment, few of the heavy workflows where data footprint may have been reduced significantly may be in Probes that may pertain to call session information and LSR that may correspond to data generated when call may latched on to the network.

| Use case | Raw Data Size Per Day | Size after storing in optimized format | Reduction in Size |
|---|---|---|---|
| Probes | 870 TB | 8.7 TB | 99% |
| LSR | 186.6 TB | 29.2 TB | 85% |

In an embodiment, the Data Ingestion module may have provided the goal of creating scalable applications to ingest and process large volume of data from a variety of sources including Kafka, HiveMQ, Solace, SFTP, NAS, and the like into Big Data Eco-System. In an way of example, and not as limitation, the Data Ingestion module may include FTTX that may be event-data about all the devices such as STB, ONT, but not limited to the like.

In another embodiment, a plurality of devices from the events may be published into systems such as HiveMQ and Solace but not limited to the like.

In another embodiment, the data from the sources may be using the data Ingestion module by first moving the data from the HiveMQ and the Solace to the Kafka and then reading the messages from Kafka in micro-batch fashion using the Kafka Receiver and after processing writing them to a table. Since there may be a plurality of devices in FTTX and may follow the same pattern, the fata ingestion module may allow to quickly develop such ingestion pipelines.

In yet another embodiment, Probes may be data feeds may contain network level information and may be captured whenever a call may be made on the network. The vendor may push all the network data to Kafka. Data volume for probes may be very high, at least 595 TB worth of data but not limited to it may be ingested every day for few of the circles.

In an embodiment, using ingestion framework data may be consumed from Kafka in a multi-threaded and micro-batch fashion, may write the data to HDFS and then may use spark to process and write the data to a table.

In an embodiment, storing the data in a compressed and optimized format may allow reduction of raw data footprint by more than 99%. In an exemplary embodiment, 595 TB raw data (JSON format) may require at least 6 TB of storage but not limited to it after converting the data to an ORC format with ZLIB compression but not limited to the like.

In yet another embodiment, Firewall data may be event logs generated for all connections established to a plurality of servers on a Cisco firewall and the like. The logs may be sent to Rsyslog server but not limited to it. The Rsyslog server may write the data into local files and NIFI may write the data into HDFS and file locations on HDFS. Using the data ingestion module, data from HDFS may be consumed and written to Hive. Data volume for the source may be at least 2 TB a day.

Figure 6:
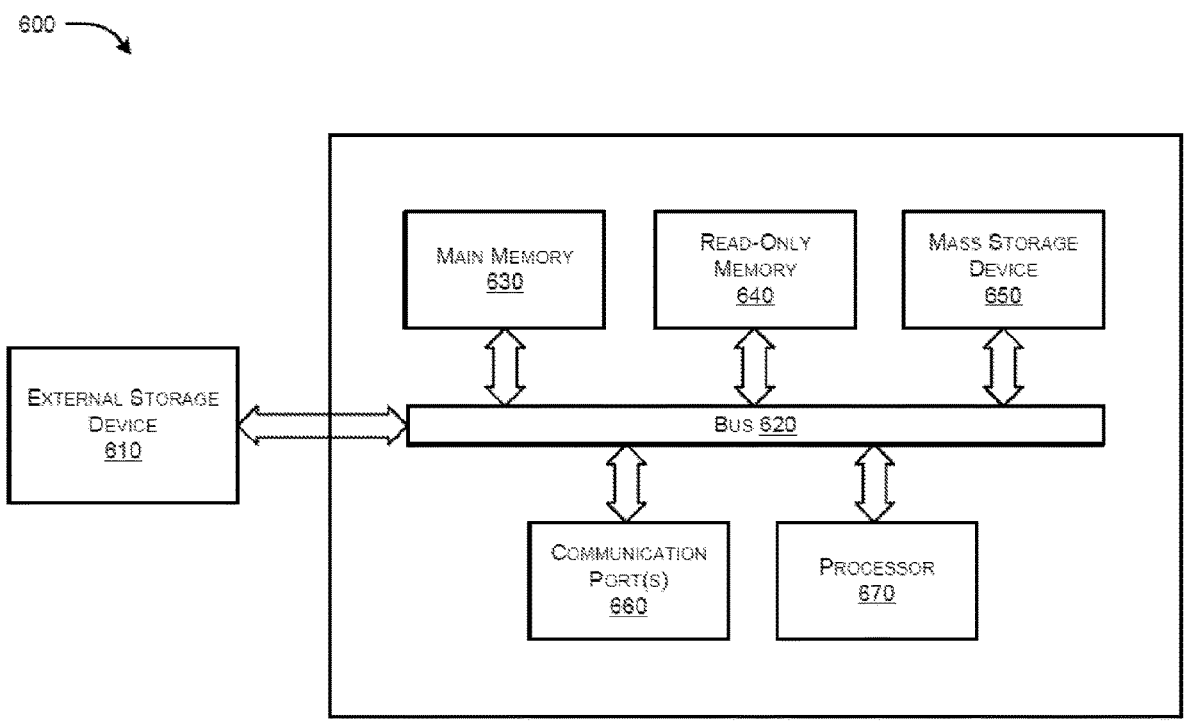
FIG. 6 illustrates an exemplary computer system in which or with which embodiments of the present invention can be utilized in accordance with embodiments of the present disclosure.

FIG. 6 illustrates an exemplary computer system in which or with which embodiments of the present invention can be utilized in accordance with embodiments of the present disclosure. As shown in FIG. 6, computer system 600 can include an external storage device 610, a bus 620, a main memory 630, a read only memory 640, a mass storage device 650, communication port 660, and a processor 670. A person skilled in the art will appreciate that the computer system may include more than one processor and communication ports. Examples of processor 660 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 660 may include various modules associated with embodiments of the present invention. Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects. Memory 630 can be Random Access Memory (RAM), or any other dynamic storage device commonly known in the art. Read-only memory 640 can be any static storage device(s) e.g., but not limited to, a Programmable Read Only Memory (PROM) chips for storing static information e.g., start-up or BIOS instructions for processor 670. Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 7K800), one or more optical discs, Redundant Array of Independent Disks (RAID) storage, e.g. an array of disks (e.g., SATA arrays).

Bus 620 communicatively couples processor(s) 670 with the other memory, storage and communication blocks. Bus 620 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 660 to software system.

Optionally, operator and administrative interfaces, e.g. a display, keyboard, and a cursor control device, may also be coupled to bus 620 to support direct operator interaction with a computer system. Other operator and administrative interfaces can be provided through network connections connected through communication port 660. The external storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, the present disclosure provides a unique and inventive solution for facilitating an application developer to quickly plugin his/her logic and ingest data into Big Data Eco-System from a variety of sources to a plurality of sinks with minimum effort. The data ingestion module may have been built in resiliency to failures inheriting the resilience from an underlying event streaming Receiver. The data ingestion module may allow to process data in micro-batches and resume/pause the application in scenarios such as job failure or applying some patches to the application. The processing rate and parallelism of an application can be scaled up and down according to the requirement with just few configuration changes. Further a data quality check module may check data and log any bad records coming from the source. Multiple sink capability may further allow the system to write to multiple sink devices from the same application. While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure provides for a system and method that facilitates a processing logic in ingestion that may keep evolving as an entity becomes more aware of the data.

The present disclosure provides for a system and method that facilitates fast and easy release of processing logic into ingestion pipelines without changing or disrupting the flow of any existing method.

The present disclosure provides for a system and method that is resilient to failures as the data Ingestion Framework is built on top of a Kafka Receiver Framework that allows for a robust multi-threaded concurrent Kafka consumer and helps in processing data in micro-batch fashion.

The present disclosure provides for a system and method to facilitate scaling of ingestion and processing rate according to use case requirement and can configure the parallelism for processing as well.

The present disclosure provides for a system and method that facilitates quick spinning up an ingestion and processing pipeline and taking to production with very low turnaround time.

The present disclosure provides for a system and method that facilitates checking for bad input records and logging the bad input records in a separate queue for audit purposes by an integrated Data Quality Module.

The present disclosure provides for a system and method that facilitates keeping the underlying Distributed Services healthy by controlling the rate of heavy data stream. For instance, controlling the number of files being created may help to avoid the Small File issue in HDFS.

The present disclosure provides for a system and method that facilitates handling schema imbalance and provides fault tolerance by reading data with schema.

The present disclosure provides for a system and method that facilitates writing multiple processing logic for same source and store in different sinks.

The present disclosure provides for a system and method that facilitates reduction in storage requirements drastically for heavy raw streams and querying the data more efficiently by storing the data in compressed and optimized formats like ORC.

We claim:

1. A system for facilitating ingestion of a set of data packets of a big data eco system by a first computing device, the system comprising:
   one or more processors coupled with a memory, wherein said memory stores instructions which, when executed by the one or more processors, causes said system to:
   receive, at a data ingestion module, the set of data packets, wherein the set of data packets pertain to a plurality of big data sources associated with one or more first computing devices;
   extract, by said data ingestion module, a set of attributes from the set of data packets received, said set of attributes pertaining to the nature of data received;
   poll, by said data ingestion module, a plurality of second computing devices based on the set of attributes extracted; and
   upon establishing polling, store, by said data ingestion module, the set of data packets in the plurality of second computing devices, wherein the set of data packets are compressed and arranged in a predefined format in real time to be stored in a configurable storage associated with the plurality of second computing devices, and wherein the compressed set of data packets is hosted in any given time without disrupting any flow of data,
   wherein the data ingestion module ingests and processes streaming and batch data packets and a combination thereof, and wherein the ingested data is passed through a plurality of micro batches, each micro-batch corresponding to a specific thread, and wherein upon execution of a set of instructions, the data ingestion module is resumed or paused whenever a first set of instructions fail to execute, or a new patch is being applied to the data ingestion module.

2. The system as claimed in claim 1, wherein the data ingestion module upon execution of the set of instructions enable a plurality of users to customize the functionality of the data ingestion module.

3. The system as claimed in claim 1, wherein the data ingestion module is configured to provide scaling, parallelism, and throughput to provide data-driven insights based on predefined configuration parameters.

4. The system as claimed in claim 1, wherein the data ingestion module is configured to identify any or a combination of bad input and issues with schema of the stored data, and wherein the bad inputs are retrieved in real time or at any given time.

5. The system as claimed in claim 1, wherein the plurality of second computing devices act as sink for a set of data packets from the same first computing device.

6. The system as claimed in claim 1, wherein the data ingestion module is configured to control a plurality of output files generated from the set of data packets received as inputs.

7. The system as claimed in claim 1, wherein the data ingestion module is configured to ingest the set of data packets in real time or during a pre-determined time.

8. A method for facilitating ingestion of a set of data packets of a big data eco-system by a first computing device, the method comprising:
   receiving, at a data ingestion module operatively coupled to a second computing device, the set of data packets, wherein the set of data packets pertain to a plurality of big data sources associated with one or more first computing devices;
   extracting, by said data ingestion module, a set of attributes from the set of data packets received, said set of attributes pertaining to the nature of data received;
   polling, by said data ingestion module, a plurality of second computing devices based on the set of attributes extracted;
   upon establishing polling, storing, by said data ingestion module, the set of data packets in the plurality of second computing devices;
   compressing and arranging the set of data packets in a predefined format in real time to be stored in a configurable storage associated with the second computing device, wherein the compressed set of data packets is hosted in any given time without disrupting any flow of data; and
   resuming or pausing the data ingestion module upon execution of a set of instructions, whenever a first set of instructions fail to execute, or a new patch is being applied to the data ingestion module.

9. The method as claimed in claim 8, wherein the method further includes:
   enabling, by the data ingestion module, upon execution of the set of instructions, a plurality of users to customize the functionality of the data ingestion module.

10. The method as claimed in claim 8, wherein the method further includes:
  providing scaling, parallelism, and throughput by the data ingestion module to provide data-driven insights.

11. The method as claimed in claim 8, wherein the method further includes:
  ingesting and processing, by the data ingestion module, streaming and batch data packets and a combination thereof, and
  wherein the ingested data is passed through a plurality of micro batches, each micro-batch corresponding to a specific thread.

12. The method as claimed in claim 8, wherein the method further includes:
  identifying any or a combination of bad input and issues with schema of the stored data by the data ingestion module, wherein the bad inputs are retrieved in real lime or at any given time.

13. The method as claimed in claim 8, wherein the method further includes:
  configuring the plurality of second computing devices as sink for the set of data packets from the same first computing device.

14. The method as claimed in claim 8, wherein the method further includes:
  controlling a plurality of output files generated from the set of data packets received as inputs by the data ingestion module.

15. The method as claimed in claim 8, wherein the method further includes:
  ingesting the set of data packets in real time or during a pre-determined time.

\* \* \* \* \*